(12) United States Patent
Wada et al.

(10) Patent No.: US 10,616,485 B2
(45) Date of Patent: Apr. 7, 2020

(54) CAMERA DEVICE AND GRAVITY COMPENSATION METHOD

(71) Applicant: PANASONIC I-PRO SENSING SOLUTIONS CO., LTD., Fukuoka (JP)

(72) Inventors: Jyouji Wada, Fukuoka (JP); Masaomi Iiizumi, Kanagawa (JP); Hideaki Yamada, Fukuoka (JP); Masamichi Ohara, Osaka (JP); Yuichi Hatase, Fukuoka (JP); Izumi Sato, Fukuoka (JP)

(73) Assignee: PANASONIC I-PRO SENSING SOLUTIONS CO., LTD., Fukuoka (JP)

( * ) Notice: Subject to any disclaimer, the term of this patent is extended or adjusted under 35 U.S.C. 154(b) by 0 days.

(21) Appl. No.: 15/943,267

(22) Filed: Apr. 2, 2018

(65) Prior Publication Data

US 2018/0302566 A1 Oct. 18, 2018

(30) Foreign Application Priority Data

Apr. 12, 2017 (JP) ................................ 2017-079201

(51) Int. Cl.
*H04N 5/232* (2006.01)
*H04N 5/225* (2006.01)

(52) U.S. Cl.
CPC ....... *H04N 5/23264* (2013.01); *H04N 5/2252* (2013.01); *H04N 5/2253* (2013.01); *H04N 5/2254* (2013.01); *H04N 5/23258* (2013.01); *H04N 5/23287* (2013.01); *H04N 5/23245* (2013.01)

(58) Field of Classification Search
CPC ............. H04N 5/23264; H04N 5/2252; H04N 5/23258
See application file for complete search history.

(56) References Cited

U.S. PATENT DOCUMENTS

| 2012/0086824 | A1* | 4/2012 | Asakura | ............. H04N 5/23258 348/208.99 |
| 2014/0055670 | A1 | 2/2014 | Hongo | |
| 2015/0264269 | A1* | 9/2015 | Yuan | .................... H04N 5/2256 348/241 |

FOREIGN PATENT DOCUMENTS

JP 2014-045304 A 3/2014

OTHER PUBLICATIONS

U.S. Appl. No. 15/923,185 to Jyouji Wada et al., filed Mar. 16, 2018.
U.S. Appl. No. 15/923,601 to Jyouji Wada et al., filed Mar. 16, 2018.

* cited by examiner

*Primary Examiner* — Christopher K Peterson
(74) *Attorney, Agent, or Firm* — Greenblum & Bernstein, P.L.C.

(57) ABSTRACT

A camera device includes an image sensor which images a subject, a lens unit that includes a lens for forming an image of the subject on a light receiving surface of the image sensor, a shaking corrector that includes a movable portion that includes the image sensor and moves the movable portion in a direction perpendicular to an optical axis of the lens unit according to shaking of the camera device to correct shaking, and a gravity support that supports the movable portion in a direction opposite to a direction of a component force of the gravity with a force equal to a component force of gravity applied to the movable portion along a direction perpendicular to the optical axis of the lens unit.

11 Claims, 10 Drawing Sheets

CAMERA DEVICE AND GRAVITY COMPENSATION METHOD

BACKGROUND

1. Technical Field

The present disclosure relates to a camera device with a shaking correction function and a gravity compensation method.

2. Description of the Related Art

In the related art, a camera module including a blurring corrector for shifting a position of an imaging element unit incorporating an imaging element and a low pass filter in order to perform blurring correction during imaging is known (for example, see Japanese Patent Unexamined Publication No. 2014-45304).

In the conventional camera module, in a case where blurring correction (shaking correction) during imaging is performed, the position of the imaging element unit in the shaking corrector is shifted by driving force of a motor. In a case where the shaking correction is not performed, the imaging element unit stops at a reference position. In this case, depending on a direction of the camera module, although the shaking correction is not performed, since the imaging element unit remains at the reference position, the driving force of the motor may be necessary. Therefore, in a case where the shaking correction is performed so that the imaging element unit is shifted in a direction opposite to a direction of gravity, the motor has a driving force for shifting the imaging element unit and it is required to provide a driving force for supporting the imaging element unit against gravity. That is, the motor actually requires a driving force greater than the driving force required for the shaking correction. Therefore, the motor having a great driving force is required, and as the size of the motor increases, the size of the shaking corrector becomes greater, and an electric power is increased to realize the great driving force. In the camera module described in Japanese Patent Unexamined Publication No. 2014-45304, an influence of gravity on such a shaking corrector is not considered.

SUMMARY

The present disclosure has been made in view of the above circumstances, and provides a camera device and a gravity compensation method capable of reducing a driving force of a motor that drives a shaking corrector taking into account an influence of gravity acting on the shaking corrector.

A camera device of the disclosure includes an image sensor that images a subject, a lens unit that includes a lens for forming an image of the subject on a light receiving surface of the image sensor, a shaking corrector that includes a movable portion which holds the image sensor and that moves the movable portion in a direction perpendicular to an optical axis of the lens unit according to shaking of the camera device to correct shaking, and a gravity support that supports the movable portion in a direction opposite to a direction of a component force of the gravity with a force equal to a component force of gravity applied to the movable portion along a direction perpendicular to the optical axis of the lens unit.

The present disclosure can reduce the driving force of the motor that drives the shaking corrector taking into account the influence of the gravity acting on the shaking corrector.

DETAILED DESCRIPTION

Figure 1:
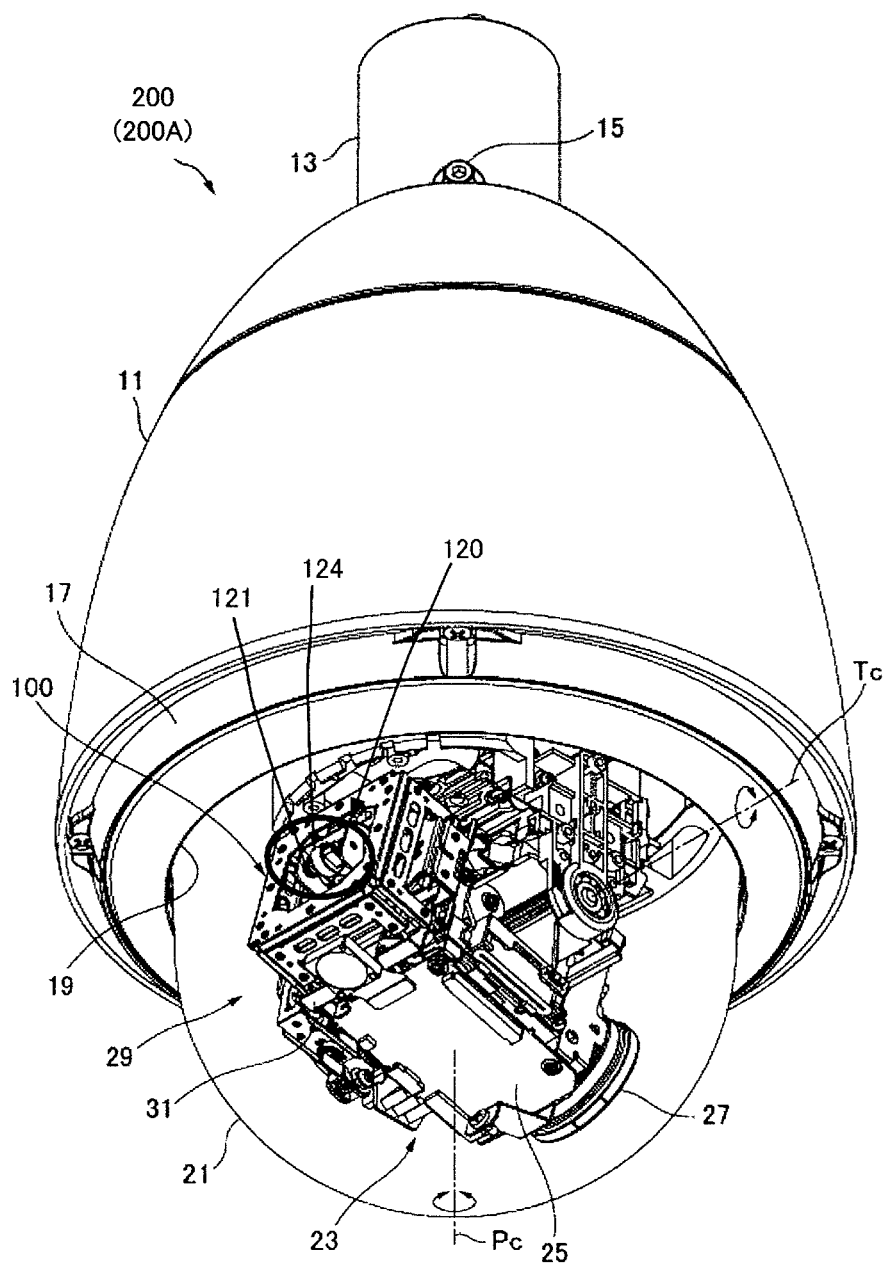
FIG. 1 is a perspective view of a monitoring camera including a shaking correction mechanism in a first exemplary embodiment.

An embodiment will now be described in detail, referring to the drawings. However, unnecessarily detailed descriptions may be omitted. For example, detailed descriptions of what are well known in the art or redundant descriptions on substantially the same configurations may be omitted. This is to prevent the following description from becoming unnecessarily redundant, to make it easier for a person of ordinary skill in the art to understand. Note that the present inventors provide the accompanying drawings and the following description in order for a person of ordinary skill in the art to sufficiently understand the present disclosure, and they are not intended to limit the subject matter set forth in the claims.

First Exemplary Embodiment

FIG. 1 is a perspective view of monitoring camera 200 (200A) including shaking correction mechanism 100 in a first exemplary embodiment.

For example, shaking correction mechanism 100 is applied to domical monitoring camera 200A illustrated in FIG. 1. Monitoring camera 200A has cylindrical outer cover 11 having, for example, a conical surface. The upper end of outer cover 11 has mounting tube 13 fixed to a mounted object such as a ceiling or a pole. Monitoring camera 200A hangs down from the pole or the like with mounting tube 13 at the upper side in a vertical direction. Outer cover 11 functions as rainproof. A plurality of fixing bolts 15 for fixing the inserted pole and the like are screwed to mounting tube 13 at equal intervals. Mounting tube 13 communicates with the inner side of outer cover 11. Inside outer cover 11, a power supply line and a signal line passed through a pole and the like are introduced through mounting tube 13.

The lower surface of outer cover 11 is, for example, a circular opening. For example, annular ring cover 17 is detachably attached to the circular opening. From inner hole 19 of ring cover 17, for example, the hemisphere side of dome cover 21 constituted by using a transparent resin material hangs down. Dome cover 21 includes a hemispherical outer shell and a cylinder connected with the same radius to the opening peripheral edge of the hemispherical outer shell. The cylinder has a flange (not shown) fixed to ring cover 17 on the side opposite to the hemispherical outer shell. In dome cover 21, the flange is disposed and fixed between ring cover 17 and outer cover 11.

For dome cover 21, for example, a resin material excellent in formability and transparency is used as a substrate material. As the resin material, an organic resin material or an inorganic resin material can be used. In the present exemplary embodiment, an organic resin material such as polycarbonate is used as a board material of the hemispherical outer shell. Since polycarbonate is hard and resistant to impact, the polycarbonate is preferable. In addition, resins with good transparency such as acrylic can be used.

The inside of dome cover 21 is a camera accommodating space. Camera 23 in which pan rotation and tilt rotation are freely centering around pan rotation center Pc in the vertical direction and tilt rotation center Tc intersecting in the direction perpendicular to the pan rotation center Pc is disposed of the camera accommodating space. Camera 23 includes lens unit 27 in camera housing 25. Camera housing 25 is provided with BIS mechanism unit 29 that performs processing of correction (hereinafter, referred to as "in-body image stabilizer (BIS)") taking into consideration the influence of shaking of camera 23. BIS mechanism unit 29 includes shaking correction mechanism 100 fixed to lens mount base 31 as an example of a base of camera housing 25. An image sensor (not shown) is attached to shaking correction mechanism 100.

Figure 2:
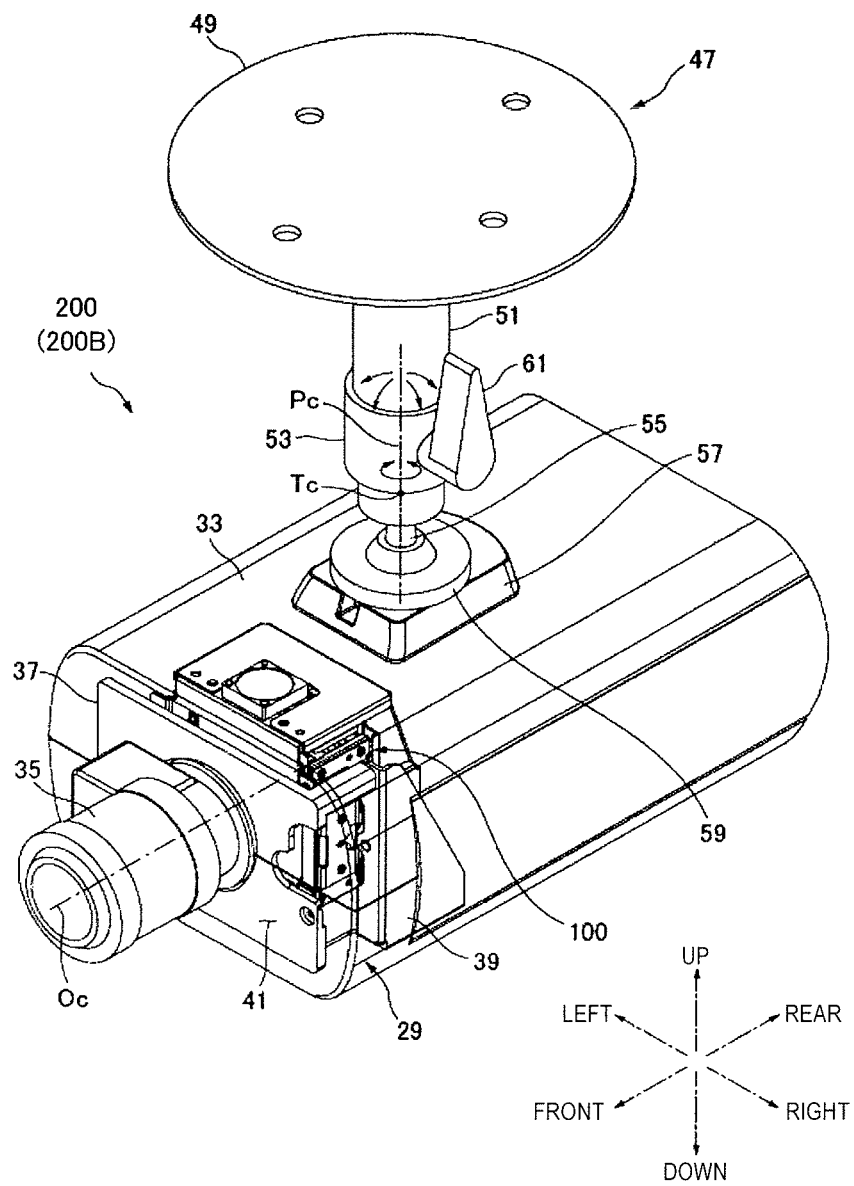
FIG. 2 is a transparent perspective view illustrating another monitoring camera having a shaking correction mechanism and a part of an internal structure in the first exemplary embodiment.

FIG. 2 is a transparent perspective view illustrating another monitoring camera 200 (200B) having shaking correction mechanism 100 and a part of an internal structure.

In the present exemplary embodiment, the up-and-down, front-rear, left and right directions follow the direction of the arrow illustrated in FIG. 2. However, these directions can be similarly applied to monitoring camera 200A illustrated in FIG. 1.

Similar to dome type monitoring camera 200A illustrated in FIG. 1, shaking correction mechanism 100 can also be applied to box type monitoring camera 200B illustrated in FIG. 2. Monitoring camera 200B accommodates camera 23 (not illustrated in FIG. 2) in box-shaped camera housing 33.

Camera 23 includes lens unit 35. Camera 23 is provided with BIS mechanism unit 29 (not illustrated in FIG. 2) that performs correction (shaking correction) processing taking the influence of shaking of Camera 23 into consideration. BIS mechanism unit 29 includes shaking correction mechanism 100 fixed to lens mount base 37 as an example of a base of camera housing 33. Shaking correction mechanism 100 is fixed to lens mount base 37. Lens mount base 37 is fixed to camera housing 33. An image sensor described later is attached to shaking correction mechanism 100.

Figure 3:
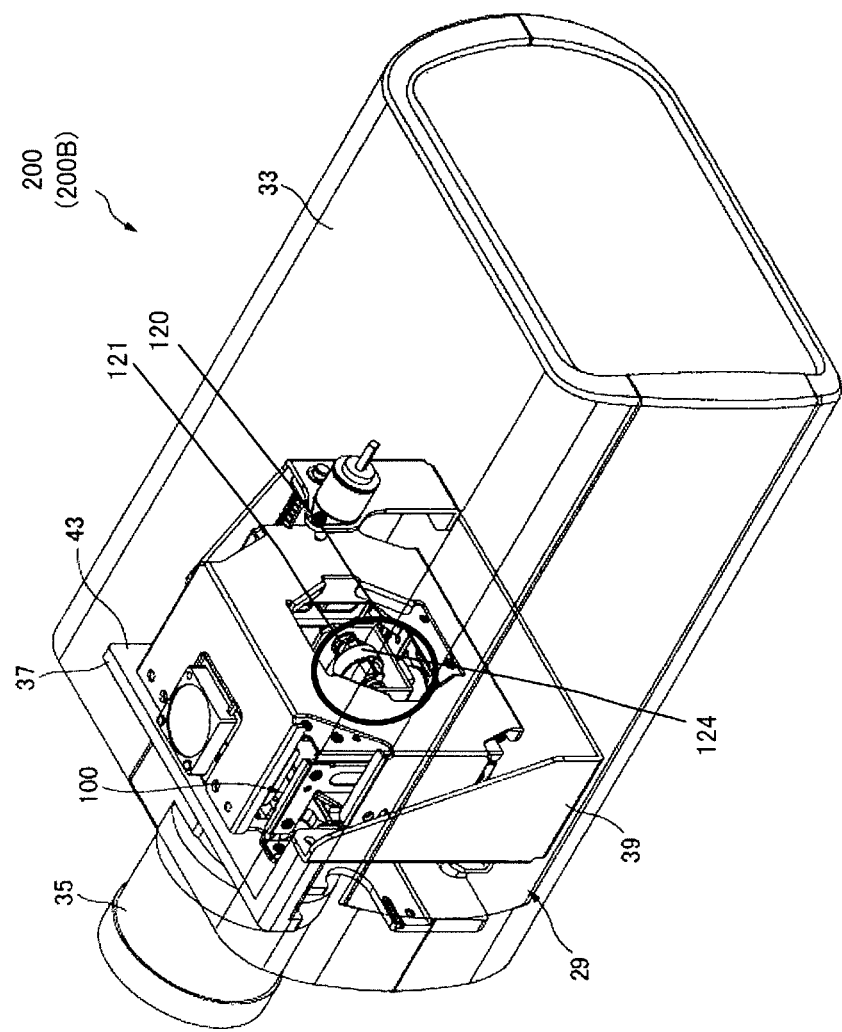
FIG. 3 is a transparent perspective view of the monitoring camera illustrated in FIG. 2 when viewed from the rear obliquely right upward.

FIG. 3 is a transparent perspective view of monitoring camera 200B illustrated in FIG. 2 when viewed from the rear obliquely right upward.

Lens mount base 37 is fixed to camera housing 33 by fixing bracket 39. Lens mount base 37 supports lens unit 35 on one surface (for example, front surface 41 illustrated in FIG. 2). In lens mount base 37, a light receiving window (not illustrated) is opened on the other surface (for example, rear surface 43) perpendicular to optical axis Oc passing through lens unit 35.

Monitoring camera 200B is attached to, for example, a ceiling surface, a wall surface, or a pole. Camera mounting base 47 illustrated in FIG. 2 is fixed to the ceiling surface, the wall surface, or the pole. Camera mounting base 47 includes fixing flange portion 49, supporting column 51 projecting from fixing flange portion 49, and direction adjuster 53 provided at the tip of supporting column 51. Direction adjuster 53 includes tripod attachment screw 55 at its tip. Tripod attachment screw 55 is screwed into the tripod mounting seat 57 of camera housing 33 and fixed by fixing ring 59.

Direction adjuster 53 supports a spherical pair with a ball (not illustrated) provided at the base end of tripod attachment screw 55 as a bearing. Accordingly, tripod attachment screw 55 enables a pivotal movement in which the sphere changes direction or rotates within the bearing. Direction adjuster 53 supports camera housing 33 by tripod attachment screw 55 freely for pan rotation about pan rotation center Pc in the direction along the vertical direction and rotates tilt rotation center Tc on pan rotation center Pc at center so as to freely tilt.

When monitoring camera 200B is attached to the ceiling surface, the wall surface, or the pole, the imaging direction is set. The imaging direction is set slightly inclined, for example, when it is attached to the ceiling surface. Monitoring camera 200B to which the imaging direction is set fixes tripod attachment screw 55 (spherical pair even) by the fixing lever 61 of direction adjuster 53.

Shaking correction mechanism 100 may be provided in either monitoring camera 200A or monitoring camera 200B as monitoring camera 200 described above.

Figure 4:
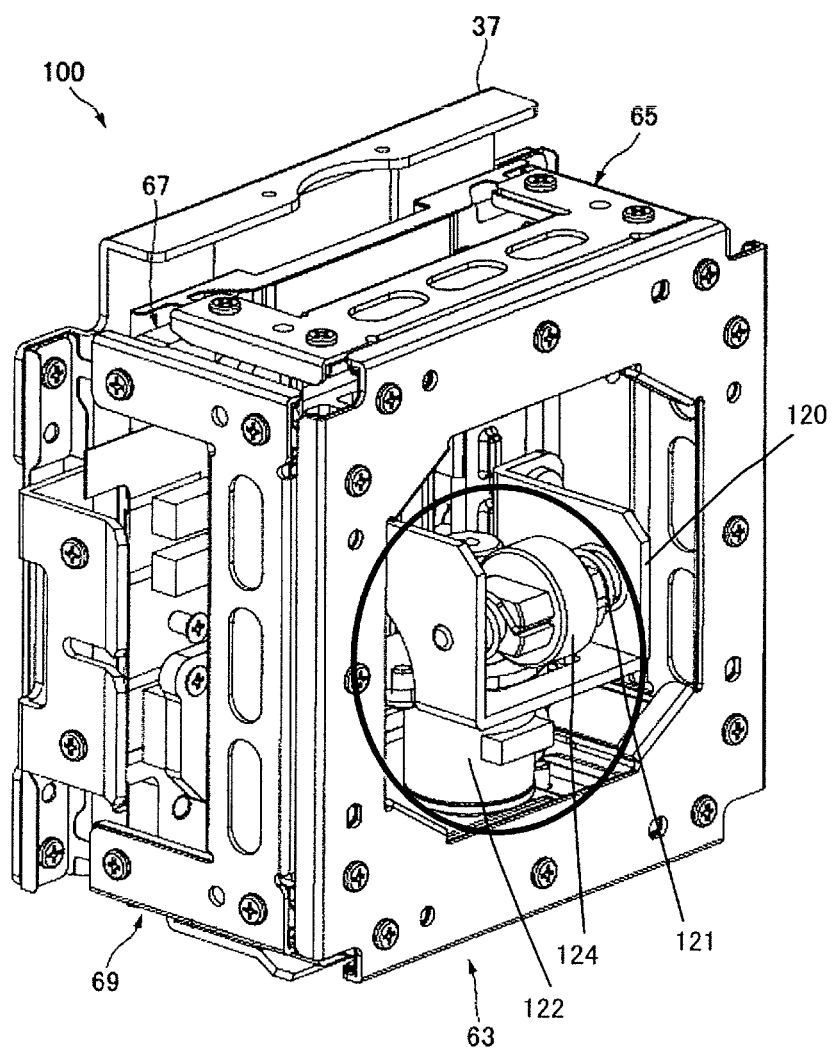
FIG. 4 is a perspective view of the shaking correction mechanism illustrated in FIG. 3 when viewed from the rear obliquely right upward.

FIG. 4 is a perspective view of shaking correction mechanism 100 illustrated in FIG. 3 when viewed from the rear obliquely right upward.

Shaking correction mechanism 100 includes lens mount base 37, first stage shaking member 63, next stage shaking member 65, and element holder 67. In shaking correction mechanism 100, first stage shaking member 63 to which next stage shaking member 65 and element holder 67 are assembled is fixed to lens mount base 37.

Figure 5:
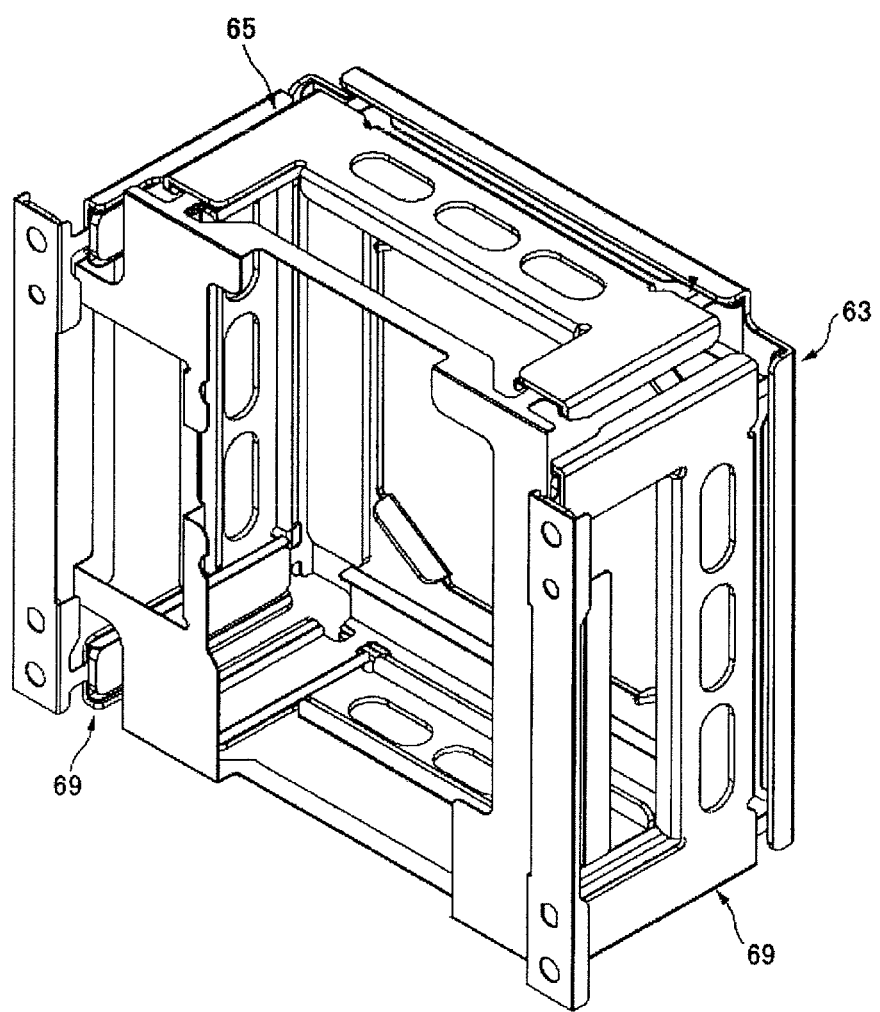
FIG. 5 is a perspective view of the shaking correction mechanism illustrated in FIG. 3 when viewed from the front obliquely right upward.

FIG. 5 is a perspective view of shaking correction mechanism 100 illustrated in FIG. 3 when viewed from the front obliquely right upward.

In shaking correction mechanism 100, next stage shaking member 65 is disposed between the pair of leg portions 69 of first stage shaking member 63. First stage shaking member 63 is fixed while being fixed to lens mount base 37 (not illustrated). Next stage shaking member 65 is further movably supported inside first stage shaking member 63. That is, first stage shaking member 63 and next stage shaking member 65 are assembled in two stages with a nested structure. Next stage shaking member 65, which is attached to the first stage shaking member 63 and becomes movable, is separated so as not to interfere with lens mount base 37. That is, next stage shaking member 65 is opposed to lens mount base 37 in a non-contact manner.

Figure 6:
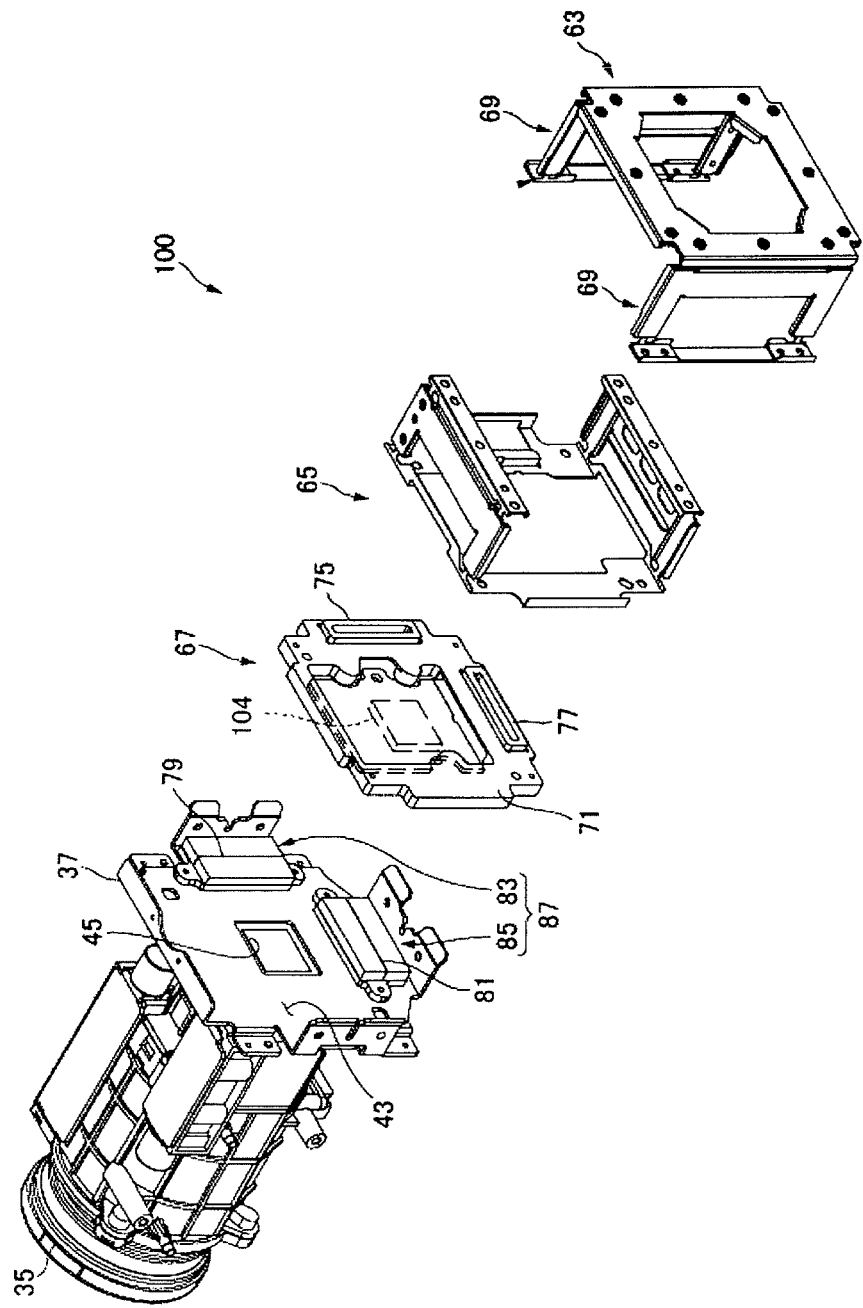
FIG. 6 is an exploded perspective view of a lens unit, a lens mount base, an element holder, a first stage shaking member, and a next stage shaking member.

FIG. 6 an exploded perspective view of lens unit 27, lens mount base 37, element holder 67, first stage shaking member 63, and next stage shaking member 65.

Element holder 67 is fixed to next stage shaking member 65. Element holder 67 includes substantially rectangular heat sink 71. Heat sink 71 is provided with a plurality of cooling fins (not illustrated). In heat sink 71, heat from image sensor 104 is transmitted by heat conduction. Heat sink 71 exhausts the heat transmitted from image sensor 104 to the air by the cooling fin. That is, image sensor 104 is air-cooled.

First coil 75 is attached to the vertical side and a second coil 77 is attached to the horizontal side on the orthogonal adjacent sides of the element holder 67. First coil 75 and second coil 77 configure first linear motor 83 and second linear motor 85 by first magnet 79 and second magnet 81 provided on two adjacent sides of lens mount base 37 so as to correspond to each other. In other words, first linear motor 83 is configured by first coil 75 and first magnet 79, and second linear motor 85 is configured by second coil 77 and second magnet 81. First linear motor 83 and second linear motor 85 configure actuator 87 for moving element holder 67 in two axial directions.

Actuator 87 drives element holder 67 (in other words, image sensor 104) in the lateral direction by first linear motor 83 and further moves element holder 67 (in other words, image sensor 104) in the vertical direction by second linear monitor 85.

Shaking correction mechanism 100 enables image sensor 104 to freely move in two axial directions perpendicular to optical axis Oc of lens unit 35. Therefore, in a case where monitoring cameras 200A and 200B shaking due to an external force or the like, monitoring cameras 200A and 200B move image sensor 104 in the direction to cancel the shaking. Therefore, deterioration of the image quality of the shot image due to shaking (image blur) can be suppressed and a good image can be obtained.

Next, a specific configuration example of monitoring camera 200 taking into account gravity compensation will be described.

Figure 7:
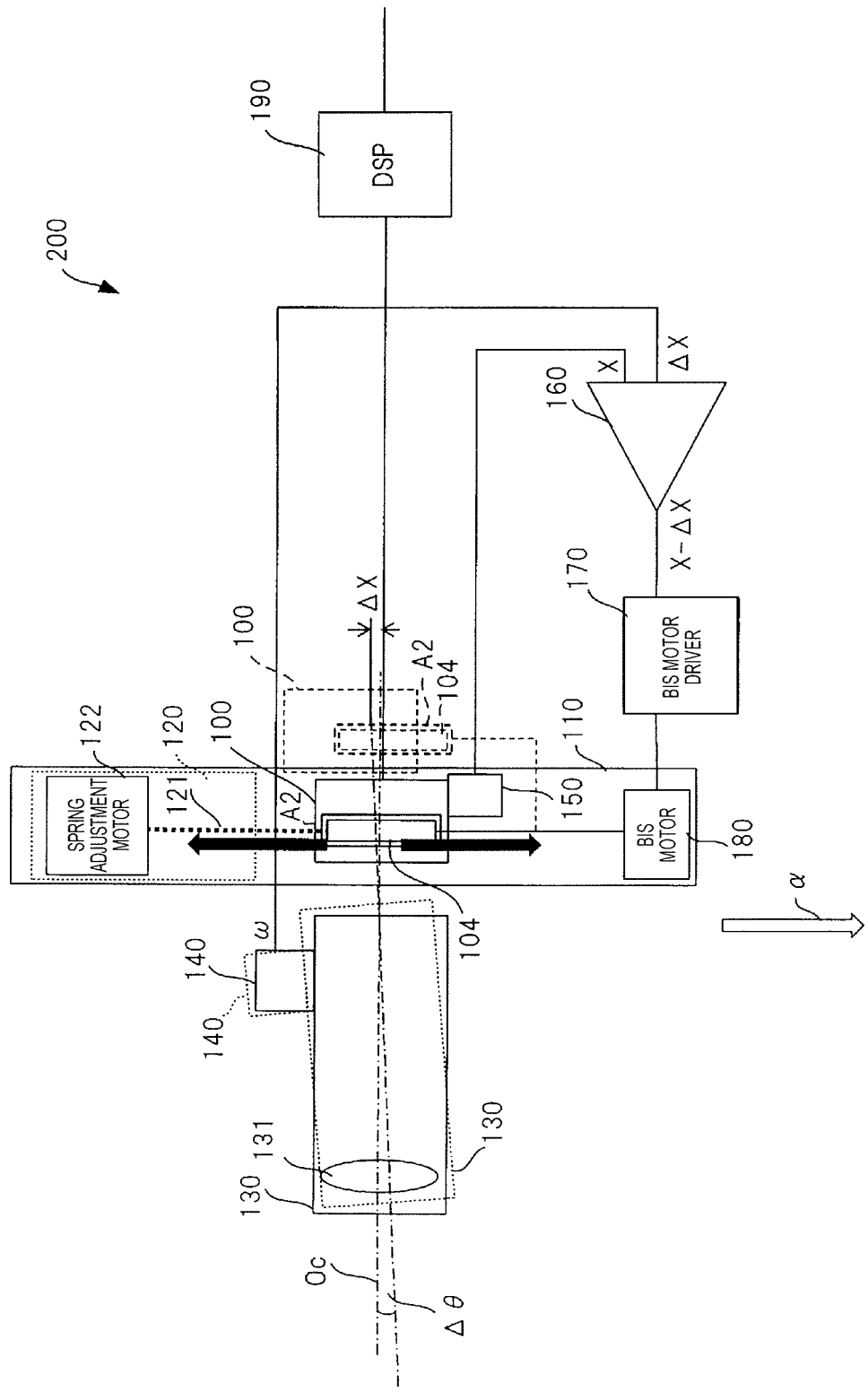
FIG. 7 is a block diagram illustrating a schematic configuration example of a monitoring camera.

FIG. 7 is a diagram illustrating a schematic configuration example of monitoring camera 200 taking into account gravity compensation. In monitoring camera 200, as one example, one direction along the light receiving surface of image sensor 104 is set as gravity direction α in FIG. 7.

In FIG. 7, shaking correction mechanism 100, image sensor 104, lens unit 130, and gyro sensor 140 indicated by the dotted lines indicate the movement of the position during the shaking correction.

Monitoring camera 200 includes BIS mechanism unit 110, lens unit 130, gyro sensor 140, comparator 160, BIS motor driver 170, BIS motor 180, and DSP (digital signal processor) 190. BIS mechanism unit 110 is, for example, BIS mechanism unit 29 illustrated in FIG. 1. Lens unit 130 is, for example, lens unit 27 illustrated in FIG. 1 and lens unit 35 illustrated in FIG. 6. BIS motor 180 is, for example, first linear motor 83 or second linear motor 85 illustrated in FIG. 6.

Image sensor 104 may be formed to include a charge coupled device (CCD) or a complementary metal oxide semiconductor (CMOS).

BIS mechanism unit 110 includes shaking correction mechanism 100, gravity compensation mechanism 120, position sensor 150, and BIS motor 180. The description of the configurators described above may be omitted or simplified in some cases.

Gravity compensation mechanism 120 adjusts the position of movable portion A2 so as to offset the gravity at the timing at which monitoring camera 200 does not shaking or at the timing when the shaking correction control is suppressed. At least image sensor 104 is mounted on movable portion A2. Gravity compensation mechanism 120 supports the component force perpendicular to optical axis Oc among the gravities applied to movable portion A2 by using gravity compensation spring 121 and gear 124 (see FIG. 1). Movable portion A2 is, for example, element holder 67. In the present exemplary embodiment, "gravity compensation" may mean that movable portion A2 is supported by gravity compensation spring 121 so as to offset the gravity acting on BIS mechanism unit 110.

Gravity compensation spring 121 can adjust the spring elastic force by driving spring adjustment motor 122 and can adjust the spring elastic force. The adjustment of the spring elastic force of gravity compensation spring 121 may be adjusted when the operation mode of monitoring camera 200 described later is set to the gravity compensation mode. Also, gravity compensation mechanism 120 may adjust the spring tension of gravity compensation spring 121 when adjusting the optical axis of monitoring camera 200. Details of the adjustment timing of the spring elastic force of gravity compensation spring 121 will be described later. The spring elastic force indicates the spring tension or the spring reaction force.

Lens unit 130 includes one or more lenses 131 for forming an image of the subject B1 (see FIG. 8) on the light receiving surface of image sensor 104. Lens 131 can be replaced with lenses of various focal distances and imaging ranges, depending on the installation location of monitoring camera 200 and imaging applications.

Gyro sensor 140 may be installed in a housing of lens unit 130. Gyro sensor 140 detects an angular velocity. This angular velocity may indicate an angular velocity related to shaking or the like of lens unit 130, that is, an angular velocity related to shaking of monitoring camera 200 or the like.

Position sensor 150 detects position x of image sensor 104. Position x of image sensor 104 can also be considered to be the position of movable portion A2 including image sensor 104. Position x of image sensor 104 may be the position of image sensor 104 with respect to lens unit 130 in a direction perpendicular to optical axis Oc (for example, vertical direction in FIG. 7). As a result of the gravity compensation performed by gravity compensation mechanism 120, position x of image sensor 104 indicates reference position xs in a case where there is no shaking in lens unit 130 or in a case where the shaking correction control is inhibited. That is, x=xs is satisfied. Reference position xs is a value 0 (xs=0) indicating that the center position of the light receiving surface of image sensor 104 is disposed on optical axis Oc, or for adjusting the deviation of the optical axis at the time of manufacturing monitoring camera 200 (Optical axis adjustment value: x1) (xs=x1) indicating the position of the optical axis. That is, optical axis Oc passes through the position of optical axis adjustment value x1. When value is 0, reference position xs is a geometric center position. Misalignment of the optical axis occurs, for example, due to variations in components at the time of manufacturing monitoring camera 200. In the optical axis adjustment, the deviation of optical axis Oc defined by lens unit 130 is adjusted.

Comparator 160 determines the output value of comparator 160 based on the information on angular velocity ω detected by gyro sensor 140 and the information on position x of image sensor 104 detected by position sensor 150. Comparator 160 may determine the output value of comparator 160 based on displacement amount Δx of the distance based on angular velocity ω and the information of position x of image sensor 104. In a case where angular velocity ω is not 0, it indicates that an angular velocity is generated in lens unit 130, that is, shaking (shaking angle Δθ and shaking amount Δx) is generated in lens unit 130. That is, it is shown that the shaking (shaking amount Δx) is generated in monitoring camera 200. Comparator 160 sends the value of (x−Δx) as an output value to BIS motor driver 170 so as to offset the shaking of lens unit 130.

BIS motor driver 170 drives BIS motor 180 based on the output value of comparator 160. BIS motor driver 170 may perform proportional-integral-differential (PID) control to BIS motor 180. That is, based on the value of (x−Δx), BIS motor driver 170 sets displacement amount Δx of the distance based on angular velocity ω detected by gyro sensor 140 to the value 0, that is, so as to offset Δx, BIS motor 180 may be subjected to feedback control.

BIS motor 180 supplies driving force to adjust the position of image sensor 104 according to a command from BIS motor driver 170. Specifically, BIS motor 180 may move movable portion A2 in the vertical direction in FIG. 7 so that the position of image sensor 104 is at the position of x−Δx. As a result, the movement of displacement amount Δx of the distance based on currently occurring angular velocity ω is canceled, and image sensor 104 is controlled to move to position x.

DSP 190 performs various types of image processing on the captured image imaged by image sensor 104.

As described above, in monitoring camera 200, gravity compensation mechanism 120 is unnecessary for a force to support the gravity from the force required at the time of shaking correction by BIS mechanism unit 110, thereby reducing the force required for shaking correction. Therefore, gravity compensation mechanism 120 can reduce the driving force of BIS motor 180 that supplies the force required for the shaking correction. Therefore, BIS motor 180 with a small driving force is sufficient, and downsizing and power saving of BIS mechanism unit 110 can be realized. Furthermore, monitoring camera 200 can lengthen the life of BIS motor 180 and lengthen the life of monitoring camera 200.

Figure 8:
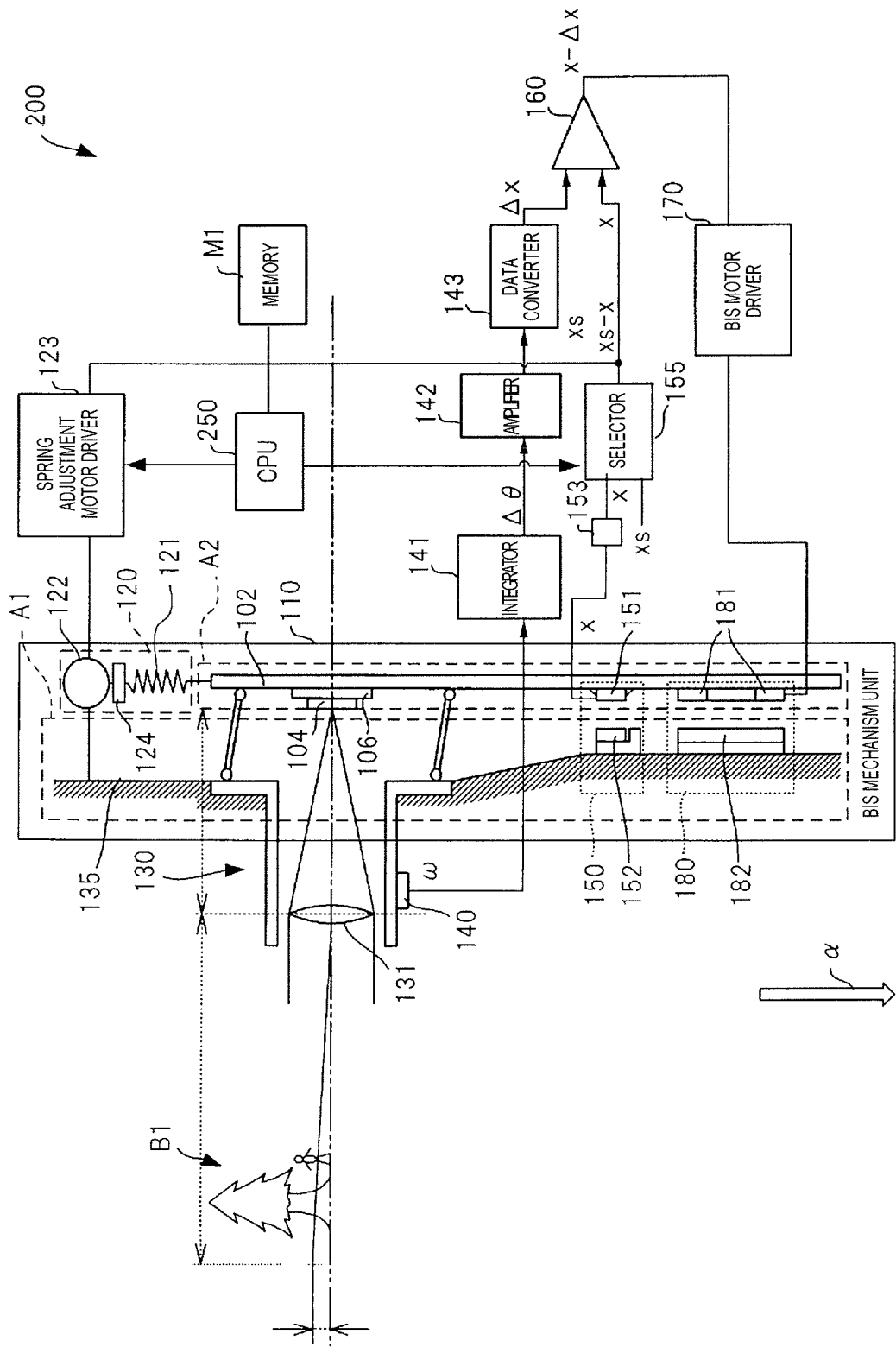
FIG. 8 is a block diagram illustrating a detailed configuration example of the monitoring camera.

FIG. 8 is a block diagram illustrating a detailed configuration example of monitoring camera 200. FIG. 8 is a diagram illustrating a schematic configuration example of monitoring camera 200 taking into account gravity compensation. In monitoring camera 200, as one example, one direction along the light receiving surface of image sensor 104 is set as the gravity direction a in FIG. 8. In FIG. 8, explanation of the same configurators as those in FIG. 7 may be omitted or simplified.

Monitoring camera 200 includes memory M1 and CPU 250. Memory M1 stores various data items, programs, tables, values, and the like. Memory M1 may store information on reference position xs. Reference position xs is 0 in a case where there is no optical axis shift and is the optical axis adjustment value x1 when there is an optical axis shift.

CPU 250 controls each portion in monitoring camera 200. CPU 250 implements various functions by executing the program stored in memory M1. CPU 250 may set the operation mode of monitoring camera 200, for example. The operation mode includes a gravity compensation mode and a shaking correction mode. The gravity compensation mode is an operation mode in which the spring elastic force of gravity compensation spring 121 can be changed for gravity compensation by gravity compensation spring 121. In gravity compensation mode, shaking correction is not implemented. The shaking correction mode is an operation mode for performing shaking correction. In the shaking correction mode, the spring elastic force of gravity compensation spring 121 is not changed. The operation mode may not be set by CPU 250 and monitoring camera 200 may operate without being aware of the operation mode. For example, CPU 250 may change the elastic force of the spring at a timing at which monitoring camera 200 does not shake, or at a timing at which the shaking correction control is inhibited, without setting the operation mode.

BIS mechanism unit 110 includes fixing portion A1 and movable portion A2. Fixing portion A1 may include lens unit 130, lens mount base 135, a part of position sensor 150, and a part of BIS motor 180. Lens mount base 135 is fixedly connected to lens unit 130. A part of position sensor 150 (for example, magnet 152) and a part of BIS motor 180 (for example, magnet 182) are installed on a surface facing movable portion A2. Since magnets 152 and 182 are larger in mass than Hall element 151 and coil 181, the magnets are preferably installed in the fixing portion A1. Lens mount base 135 is fixed to the camera housing (for example, camera housing 25 or camera housing 33). That is, the position of fixing portion A1 with respect to the main body of monitoring camera 200 is fixed. Fixing portion A1 includes at least lens unit 130 and lens mount base 135. Lens mount base 135 is, for example, lens mount base 37. Magnet 152 is, for example, first magnet 79 or second magnet 81.

Movable portion A2 includes board 102 and various electrical components and electronic components (at least image sensor 104) mounted on board 102. Movable portion A2 may include image sensor 104, sensor board 106, and gravity compensation spring 121 of gravity compensation mechanism 120, spring adjustment motor 122, a part of position sensor 150, and a part of BIS motor 180. A part of position sensor 150 (for example, Hall element 151) and a part of BIS motor 180 (for example, coil 181) are installed on a surface facing fixing portion A1. Movable portion A2 includes at least image sensor 104. Coil 181 is, for example, first coil 75 or second coil 77.

The positional relationship between movable portion A2 and lens unit 130 is variable. That is, movable portion A2 is movable with respect to lens unit 130. Movable portion A2 moves in a direction orthogonal to optical axis Oc in accordance with the shaking occurring in the monitoring camera. In FIG. 8, it is exemplified that it is orthogonal to optical axis Oc and moves along gravity direction α. In FIG. 8, movable portion A2 may move in the horizontal direction perpendicular to gravity direction α and gravity direction α (another direction orthogonal to optical axis Oc, the depth direction in FIG. 8). Unlike fixing portion A1, the position of the movable portion A2 with respect to the main body of monitoring camera 200 is not fixed, and it is movable according to the shaking. Movable portion A2 moves so as to offset the displacement of the position of image sensor 104 due to the shaking when shaking occurs in monitoring camera 200.

Gravity compensation mechanism 120 includes gravity compensation spring 121, spring adjustment motor 122, and gear 124. In addition, monitoring camera 200 includes spring adjustment motor driver 123.

Gravity compensation spring 121 pulls and supports movable portion A2 along the surface of board 102 of movable portion A2 by the spring elastic force in a direction opposite to the component force perpendicular to optical axis Oc among the gravity. The spring elastic force of gravity compensation spring 121 may be equal to component force F1 of gravity applied to movable portion A2 (see FIG. 9). The length of gravity compensation spring 121 may be adjusted by gear 124. Movable portion A2 may be pushed up by spring elastic force due to the structure of gravity compensation spring 121.

Spring adjustment motor 122 supplies a driving force to gear 124, and adjusts the spring elastic force of gravity compensation spring 121 by gear 124. Component force F1 of gravity applied to movable portion A2 changes in accordance with inclination θ1 (see FIG. 9) of movable portion A2 with respect to the direction of gravity. The inclination of movable portion A2 changes in accordance with the inclination of lens unit 130, that is, the inclination changes in accordance with the direction of monitoring camera 200. Spring adjustment motor 122 adjusts the spring elastic force of gravity compensation spring 121 to match the force of the gravity component (component force F1 of gravity) applied to movable portion A2 according to the direction of monitoring camera 200. Spring adjustment motor 122 is driven to rotate forward or reverse, for example, in response to a command from spring adjustment motor driver 123, and transmits the driving force to gear 124 via a shaft or the like.

The spring elastic force of gravity compensation spring 121 may be adjusted according to the length of the spring portion wound by gear 124. Spring adjustment motor 122 is driven at the time of initial setting (for example, at the time of initial installation of monitoring camera 200) or when the inclination of lens unit 130 is changed, the spring elastic force of gravity compensation spring 121 is adjusted, and the spring elastic force of the gravity compensation spring 121 may be fixed without driving in timing or operation mode (for example, normal monitoring mode). The normal monitoring mode may be a mode in which shaking correction is performed, which is monitored during normal operation.

Gear 124 can wind up a part of gravity compensation spring 121 by driving spring adjustment motor 122. The spring constant can be changed by changing the winding amount of gravity compensation spring 121 according to the magnitude of component force F1 of gravity. Gear 124 may adjust the length of gravity compensation spring 121 in stages and have a mechanism for preventing rotation in the direction opposite to the winding direction so that the length of gravity compensation spring 121 does not unintentionally return to the original length.

Spring adjustment motor driver 123 sends the driving force (for example, driving power, driving voltage, and driving current) for driving spring adjustment motor 122 to spring adjustment motor 122. Spring adjustment motor driver 123 controls the driving force of spring adjustment motor 122 based on the information on position x of image sensor 104 and reference position xs from selector 155. For example, spring adjustment motor driver 123 may adjust the driving force of spring adjustment motor 122 so that position x of image sensor 104 becomes reference position xs. As described above, reference position xs is the center position (xs=0) of the light receiving surface of image sensor 104 or the position (xs=x1) for optical axis adjustment on optical axis Oc.

Monitoring camera 200 may include gyro sensor 140, integrator 141, amplifier 142, and data converter 143. Integrator 141 integrates angular velocity ω, which is the detection value detected by gyro sensor 140 and obtains the information of change amount Δθ of the angle. Amplifier 142 amplifies the signal indicating change amount Δθ of the angle obtained by integrator 141.

Data converter 143 converts the information of change amount Δθ of the angle output from amplifier 142 into the information of displacement amount Δx of the distance (length). Data converter 143 may convert the angle information into distance information based on the relationship between angle change amount Δθ of lens unit 130 and displacement amount Δx of distance corresponding to angle change amount Δθ. Information of displacement amount Δx of each distance corresponding to change amount Δθ of each angle may be stored in the conversion table (not illustrated) as the displacement correspondence information and stored in memory M1. By referring to the conversion table, data converter 143 may derive the information of displacement amount Δx of the distance from the information of angle change amount Δθ. This conversion table may be prepared for each lens attached to monitoring camera 200. When the lens attached to monitoring camera 200 is exchanged, the focal distance changes and the relationship between angle change amount Δθ and distance displacement amount Δx changes.

Monitoring camera 200 may include position sensor 150, Hall element amplifier 153, and selector 155.

Position sensor 150 is formed including Hall element 151 and magnet 152 and may function as a Hall sensor. The detection value of position sensor 150 may be value 0 or optical axis adjustment value x1 in a case where movable portion A2 is positioned at reference position xs. In a case where movable portion A2 moves along the direction of component force F1 of gravity in a direction opposite to the direction of component force F1 of gravity than reference position xs, the detection value of position sensor 150 is, for example, the value of reference position xs (value 0 or value x1). In a case where movable portion A2 moves along the direction of component force F1 of gravity in the direction of component force F1 of gravity than reference position xs, the detection value of position sensor 150 is, for example, the value of reference position xs (value 0 or value x1). In the absence of shaking correction, position x of image sensor 104 becomes reference position xs by performing gravity compensation with gravity compensation spring 121.

The information on position x detected by position sensor 150 may be used for performing shaking correction. Information on position x detected by position sensor 150 may be used to change the spring elastic force of gravity compensation spring 121. That is, monitoring camera 200 can acquire the position information required at the time of shaking correction and the position information required at the time of gravity compensation by position sensor 150. That is, monitoring camera 200 can share position sensor 150 for shaking correction and for gravity compensation.

Hall element amplifier 153 amplifies a signal indicating a detection value (detection value of position sensor 150) detected by Hall element 151.

Selector 155 sends either position x detected by position sensor 150 or reference position xs to spring adjustment motor driver 123 and comparator 160. Selector 155 may send the information on reference position xs stored in memory M1 as the output value to spring adjustment motor driver 123 as being the position after the movement of image sensor 104 taking into account gravity. Selector 155 selects the information (xs−x) of the difference between reference position xs stored in memory M1 and position x detected by position sensor 150 as an output value, and a distance of image sensor 104 taking account into gravity to be moved and may send the information to spring adjustment motor driver 123. On the other hand, selector 155 selects the information on position x detected by position sensor 150 as the output value and selects the position after moving of image sensor 104 in the state of no shaking and send the information to comparator 160.

Selector 155 may determine the output destination of the output value of selector 155 according to the operation mode of monitoring camera 200. Selector 155 may send the output value information to the spring adjustment motor driver 123 only when the operation mode is the gravity compensation mode. Selector 155 may send the output value information to comparator 160 only a case where the operation mode is the shaking correction mode. In addition, regardless of the operation mode, information on the output value may be sent to spring adjustment motor driver 123 only at the time of gravity compensation, or information on the output value may be sent to comparator 160 only at the time of shaking correction. Gravity compensation and shaking correction may be exclusively performed so that execution timings do not overlap.

Further, the selector 155 may send the output value to both spring adjustment motor driver 123 and comparator 160 at the same time. In this case, spring adjustment motor driver 123 stops controlling the driving force of spring adjustment motor 122 based on the acquired output value in a case where spring adjustment motor driver 123 is set to the shaking correction mode or at the time of the shaking correction. Spring adjustment motor driver 123 makes the driving force of spring adjustment motor 122 invariable. Accordingly, monitoring camera 200 can suppress the spring elastic force of gravity compensation spring 121 from being changed at the time of shaking correction, and it is possible to suppress deterioration of the accuracy of the shaking correction.

Comparator 160 compares displacement amount Δx of the distance obtained by data converter 143 with position x of image sensor 104 obtained by position sensor 150. Comparator 162 sends the information of (x−Δx) which is the difference between values x and Δx to BIS motor driver 170. In a case where there is no shaking in monitoring camera 200, displacement amount Δx of the distance of movable portion A2 becomes the value 0. In this case, movable portion A2 is adjusted to be arranged at position x by the spring elastic force of gravity compensation spring 121.

BIS motor driver 170 may feedback-control BIS motor 180 based on the difference (x−Δx) obtained from comparator 160.

BIS motor 180 is formed including coil 181 and magnet 182 and may function as a linear motor. Coil 181 may be a loop coil. By a command from BIS motor driver 170, BIS motor 180 adjusts the position of movable portion A2 with respect to fixing portion A1, that is, the position of image sensor 104 with respect to lens unit 130 so as to be the position of the difference (x−Δx) obtained by comparator 160. The position of BIS motor 180 may be adjusted by a linear motor according to the positional relationship between coil 181 and magnet 182. BIS motor 180 adjusts the position of movable portion A2 in the direction along the surface of board 102 of movable portion A2 by driving the linear motor. The direction along the surface of board 102 of movable portion A2 is the direction along gravity direction α in FIG. 8.

In FIGS. 7 and 8, the movement of movable portion A2 in the direction of one axis (vertical direction in FIGS. 7 and 8) perpendicular to optical axis Oc is detected to correct the shaking. It also applies to the detection of the movement of movable portion A2 in the direction of the other axis perpendicular to optical axis Oc.

Figure 9:
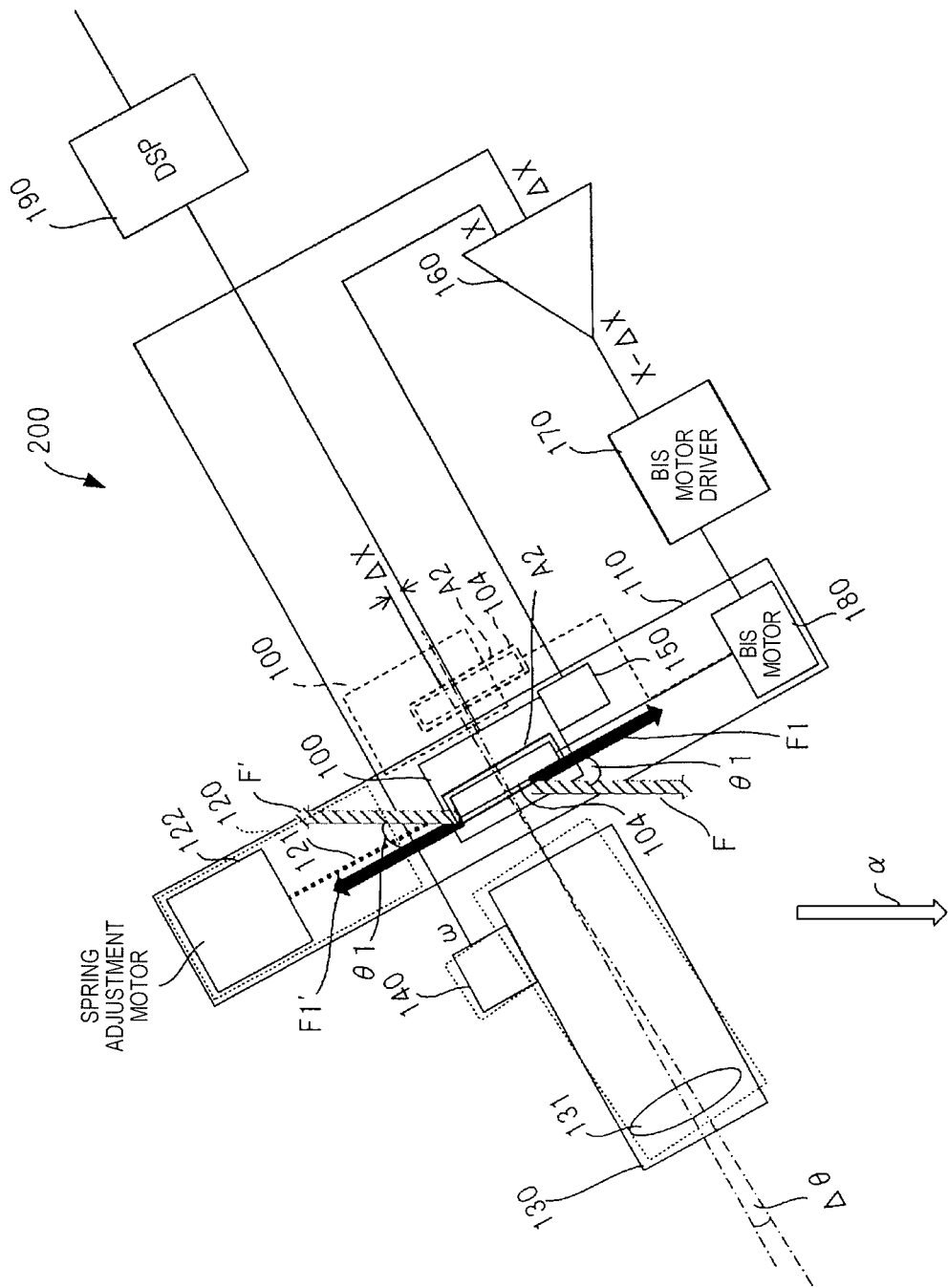
FIG. 9 is a block diagram illustrating a schematic configuration example of the monitoring camera taking into account a component force of gravity.

FIG. 9 is a block diagram showing a schematic configuration example of monitoring camera 200 taking account of component force F1 of gravity. In FIG. 9, as one example, one direction along the light receiving surface of image sensor 104 is inclined by angle θ1 with respect to the direction of gravity a. In FIG. 9, the same configurators as those in FIG. 7 will be omitted or simplified in explanation.

Movable portion A2 moves in a direction orthogonal to optical axis Oc. Component force F1 of gravity acts on movable portion A2 in a direction orthogonal to optical axis Oc in accordance with the gravity acting on movable portion A2. Component force F1 of gravity varies according to the magnitude of angle θ1. For example, assuming that the gravity acting on the movable portion A2 is F, component force F1 of gravity applied to movable portion A2 may be expressed by the following (Expression 1).

$$F1 = F \times \cos \theta 1 \qquad \text{(Expression 1)}$$

Gravity compensation spring 121 obtains spring reaction force F1' for component force F1 of gravity by pulling movable portion A2 toward gravity compensation spring 121 along the direction orthogonal to optical axis Oc to support component force F1 of gravity to be applied on movable portion A2. Spring reaction force F1' is a force in the opposite direction and the same magnitude as component force F1 of gravity. Accordingly, gravity compensation spring 121 can obtain reaction force F' in the opposite direction and the same magnitude as gravity F applied to movable portion A2. Therefore, the gravity compensation spring 121 can support movable portion A2 with respect to gravity F and can compensate for gravity.

Spring reaction force F1' increases as angle θ1 decreases, that is, the direction of movable portion A2 (the direction along the surface of board 102 or the light receiving surface of image sensor 104) becomes closer to the direction of gravity. The reason why spring reaction force increases is that the gravity to be applied to movable portion A2 tends to work along the direction orthogonal to optical axis Oc. In a case where angle θ1 is 0°, component force F1 of gravity to be applied to movable portion A2 is equal to the gravity to be applied to movable portion A2.

On the other hand, spring reaction force F1' decreases as angle θ1 increases, that is, as the direction of movable portion A2 (the direction along the surface of board 102 or the light receiving surface of the image sensor) becomes closer to the horizontal direction. The reason why the spring force decreases is that the gravity acting on movable portion A2 becomes hard to work along the direction orthogonal to optical axis Oc. In a case where angle θ1 is 90°, component force F1 of gravity applied to movable portion A2 has the value 0.

By using position sensor 150, monitoring camera 200 does not particularly pay attention to the magnitude of gravity F and the magnitude of component force F1 of the gravity based on the position indicated by position sensor 150, and supports component force F1 of gravity by gravity compensation spring 121, and it is possible to obtain spring reaction force F1' and support movable portion A2.

Next, the adjustment timing of the spring elastic force of gravity compensation spring 121 will be described.

In a case where a predetermined trigger occurs, gravity compensation mechanism 120 may change the spring constant of gravity compensation spring 121 to change the spring elastic force. For example, in a case where the operation mode of monitoring camera 200 is set to the gravity compensation mode, CPU 250 changes the spring elastic force of gravity compensation spring 121, and may prohibit the change of the spring elastic force of gravity compensation spring 121 in a case where the shaking correction mode is set. Accordingly, monitoring camera 200 can adjust the spring elastic force of gravity compensation spring 121 during the period in which movable portion A2 for shaking correction is not moved, and the accuracy of gravity compensation can be improved.

CPU 250 may change the spring elastic force of the gravity compensation spring 121 in a case of detecting the operation of an operation unit (not illustrated) such as a button provided on monitoring camera 200. Accordingly, monitoring camera 200 can adjust the spring elastic force of gravity compensation spring 121 at a timing desired by the user.

CPU 250 may change the spring elastic force of gravity compensation spring 121 in a case where the current time clocked by a timer (not illustrated) is a predetermined time. For example, CPU 250 may change the spring elastic force of the gravity compensation spring 121 in a time period (for example, late-night time zone) in which shaking is unlikely to occur with respect to monitoring camera 200. Accordingly, monitoring camera 200 can adjust the spring elastic force of the gravity compensation spring 121 during a period of less shaking of monitoring camera 200, thereby improving the accuracy of gravity compensation.

CPU 250 may change the spring elastic force of gravity compensation spring 121 in a case where the direction of monitoring camera 200 is changed. In the case of dome type monitoring camera 200, CPU 250 may determine that the direction of monitoring camera 200 is changed in a case where it is detected that adjustment position of direction adjuster 53 is changed in the tilt direction. That is, in a case where the turning amount of the tilt rotation axis is changed, CPU 250 may change the spring elastic force of gravity compensation spring 121. In addition, CPU 250 may change the spring elastic force of gravity compensation spring 121 in a case where the mounting direction of the box-shaped monitoring camera 200B is changed. Thereby, even when the direction of monitoring camera 200 is changed and the component force of gravity to be applied to movable portion A2 changes, monitoring camera 200 changes the reaction force of the component force of gravity in accordance with the change in the component force of gravity. It is possible to compensate gravity by suitably.

When the direction of monitoring camera 200 changes, the magnitude of component force F1 of gravity to be applied to movable portion A2 changes. When adjusting the shaking of BIS mechanism unit 110, the adjustment position in the tilt direction of monitoring camera 200 is not changed.

The spring elastic force of gravity compensation spring 121 is changed by spring adjustment motor driver 123 changing the driving force of spring adjustment motor 122.

MODIFICATION EXAMPLE

In the modified example, it is assumed that the position of image sensor 104 (the position of movable portion A2) is derived using the inclination sensor. FIG. 9 is a diagram illustrating a schematic configuration example of monitoring camera 200 according to the modified example.

Figure 10:
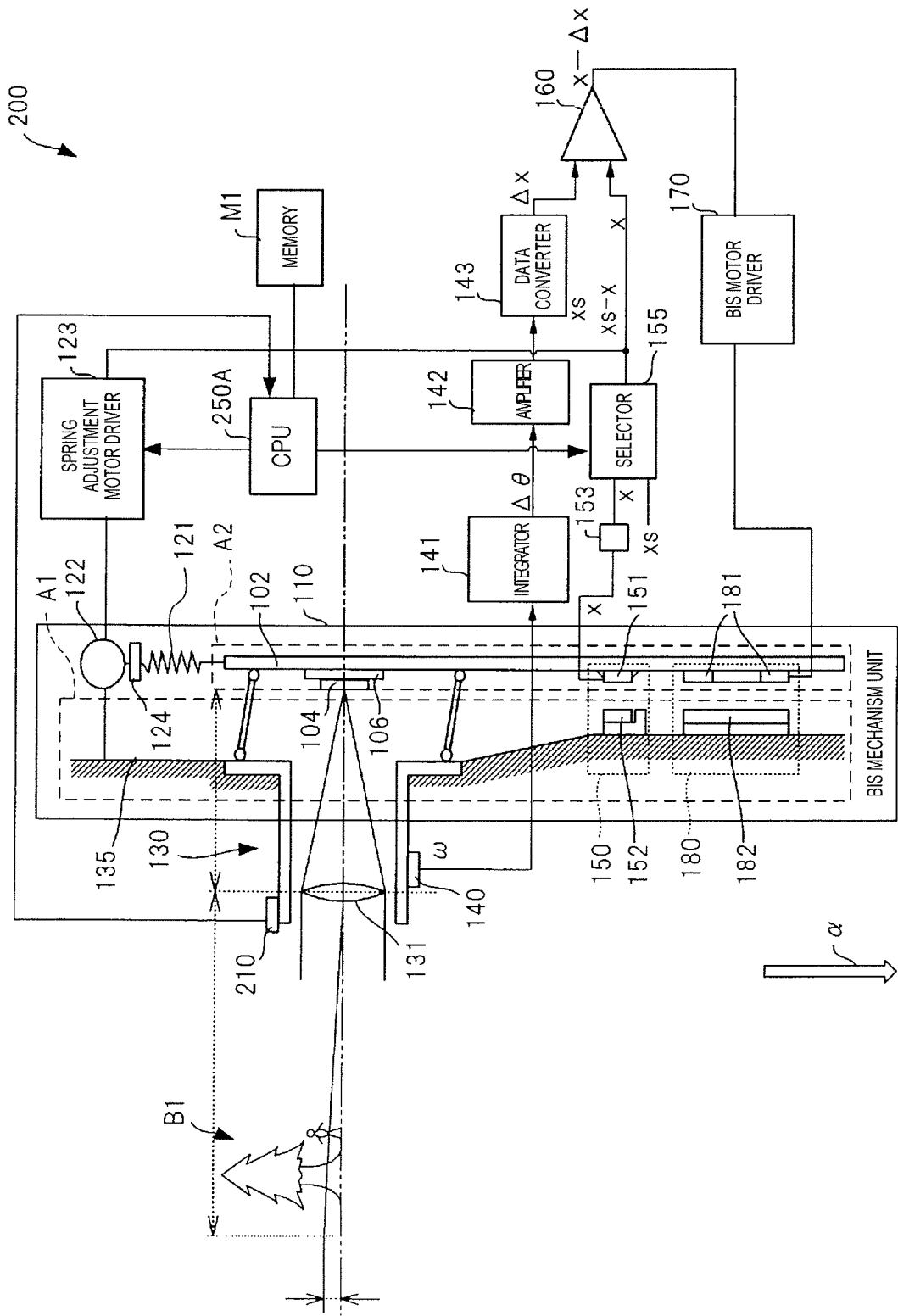
FIG. 10 is a block diagram illustrating a detailed configuration of the monitoring camera including an inclination sensor.

FIG. 10 is a block diagram illustrating a detailed configuration example of a monitoring camera including an inclination sensor. When comparing FIG. 10 and FIG. 7, in FIG. 10, monitoring camera 200 includes inclination sensor 210 and CPU 250A. In FIG. 10, explanations of the same configurators as those in FIG. 7 may be omitted or simplified.

Inclination sensor 210 detects the inclination of lens unit 130 with respect to the horizontal direction as the inclination of lens unit 130.

CPU 250A has the function of the CPU 250 described above and the following functions. CPU 250A acquires information on the inclination of lens unit 130. CPU 250A derives the magnitude of the component force of gravity applied to movable portion A2 from the inclination information of lens unit 130. Here, the inclination of lens unit 130 is set to θ2. In a state where lens unit 130 is not inclined, that is, a component force of gravity (=gravity) to be applied to movable portion A2 in a state where lens unit 130 is disposed along the horizontal direction and movable portion A2 is disposed along the direction of gravity becomes B. The component force (=gravity) of gravity to be applied to the movable portion A2 in a state where the inclination of lens unit 130 with respect to the horizontal direction is θ2, that is, the inclination of movable portion A2 with respect to the direction of gravity is θ2 is F2. In this case, component force F2 of gravity to be applied to movable portion A2 may be expressed by the following (Equation 2). The information on the magnitude of gravity F to be applied to movable portion A2 is known and may be stored in memory M1, for example.

$$F2 = F \times \cos\theta2 \qquad \text{(Expression 2)}$$

By using the inclination angle detected by inclination sensor 210, CPU 250A can estimate to what extent component force F2 of gravity is changed. CPU 250A notifies the information of the magnitude of component force F2 of gravity to spring adjustment motor driver 123. Motor driver 213 controls the driving force of spring adjustment motor 122 so as to apply the spring reaction force to component force F2 to gravity compensation spring 121.

As described above, in monitoring camera 200, inclination sensor 210 may detect the inclination angle of lens unit 130, that is, BIS mechanism unit 110. Monitoring camera 200 may derive the component force of gravity exerted on movable portion A2 along the direction perpendicular to optical axis Oc based on the inclination angle of lens unit 130. Spring adjustment motor driver 123 may control the driving force of spring adjustment motor 122 based on the component force of gravity.

Accordingly, without using position sensor 150, monitoring camera 200 can estimate component force F2 of gravity to be applied to movable portion A2 from the inclination angle of lens unit 130 from the component force of gravity applied to movable portion A2. Therefore, monitoring camera 200 can derive the spring elastic force to be applied to gravity compensation spring 121 with a simple configuration different from position sensor 150 for shaking correction, and can adjust the driving force of spring adjustment motor 122. Accordingly, in monitoring camera 200, position sensor 150 can be used for shaking correction and the inclination sensor 210 can be used for gravity compensation. Therefore, both can be selectively used for each application. In addition, monitoring camera 200 can omit a configuration (for example, selector 155) for using the value of position sensor 150 for gravity compensation.

As described above, monitoring camera 200 is provided with gravity compensation spring 121 for compensating for the gravity of image sensor 104. Gravity compensation spring 121 is capable of adjusting the spring reaction force (supporting force) for gravity compensation based on the direction of monitoring camera 200 (inclination angle of lens unit 130). Monitoring camera 200 is provided with spring adjustment motor 122 for adjusting the spring reaction force. Monitoring camera 200 includes spring adjustment motor driver 123 for controlling the driving force of spring adjustment motor 122.

Monitoring camera 200 may derive the spring reaction force required for gravity compensation spring 121 by feeding back the detection value of position sensor 150 included in BIS mechanism unit 110. Specifically, in BIS mechanism unit 110 of spring adjustment motor driver 123, spring adjustment motor 122 (for example, a spring motor) is controlled so that position sensor 150 indicates reference position xs (for example, the zero position) in a state where there is no shaking in monitoring camera 200 and may adjust gear 124. In this case, monitoring camera 200 does not require to include inclination sensor 210, and the configuration of monitoring camera 200 can be simplified.

Monitoring camera 200 may derive the spring reaction force required for gravity compensation spring 121 based on the detection value by inclination sensor 210. Specifically, spring adjustment motor driver 123 may calculate component force F2 of gravity as the inclined gravity vector based on the angle obtained by inclination sensor 210. Spring adjustment motor driver 123 may control spring adjustment motor 122 and adjust gear 124 so that a spring reaction force equivalent to component force F2 of gravity can be obtained.

In a case where monitoring camera 200 is the box-shaped monitoring camera 200B, gravity may be compensated by the spring reaction force of gravity compensation spring 121 as an initial setting at the time of installation. In dome type monitoring camera 200 as monitoring camera 200 as the PTZ camera or the PT camera, the direction of monitoring camera 200 can be changed, that is, the inclination amount of monitoring camera 200 can be changed. In this case, monitoring camera 200 may adjust the spring reaction force of the gravity compensation spring each time the inclination amount of monitoring camera 200 changes.

In addition, monitoring camera 200 may cooperate with various sensors such as a door opening and closing sensor. The door opening and closing sensor may be a sensor that detects opening and closing of a door that partitions the space where monitoring camera 200 is installed. In monitoring camera 200, CPU 250 may acquire a detection signal indicating that the door is opened via a communication device or the like. CPU 250 may control the direction of lens unit 130 so as to direct lens unit 130 in the direction in which the door is installed. In this case, as the direction of lens unit 130 is changed, component force F1 of gravity to be applied to movable portion A2 can be changed. Even in this case, CPU 250 can recognize the direction of lens unit 130 and recognize the inclination angle of lens unit 130, thereby instructing motor driver 213 of the driving force of spring adjustment motor 122. The relationship between the position of the door and the direction of lens unit 130 may be held in advance in a table or the like and stored in memory M1. The relationship between the inclination of lens unit 130 and the spring elastic force of gravity compensation spring 121 may be held in advance in a table or the like and stored in memory M1.

According to monitoring camera 200, by supporting movable portion A2 with gravity compensation spring 121, it is possible to reduce the force in the gravity direction to be applied to movable portion A2. For example, monitoring camera 200 can cancel the force in the direction of gravity. Therefore, in order to support movable portion A2 in the direction opposite to the direction of gravity, it is unnecessary to provide BIS motor 180 having a large driving force for shaking correction. Therefore, monitoring camera 200 can suppress continuing to supply the current for driving the BIS motor in order to apply the driving force to BIS motor 180 in order to obtain the reaction force of gravity. Therefore, monitoring camera 200 can also reduce heat and torque generated by driving the BIS motor.

In addition, in a case where the direction of monitoring camera 200, that is, the direction of lens unit 130 is variable, the magnitude of the component force of gravity to be applied in the direction perpendicular to the optical axis of movable portion A2 changes according to gravity. Even in this case, monitoring camera 200 can support movable portion A2 with a force balancing with the component force of gravity by adjusting the spring elastic force of gravity compensation spring 121. Therefore, even if the gravity load to be applied to movable portion A2 varies due to the change in the direction of monitoring camera 200, it becomes unnecessary for monitoring camera 200 to be provided with BIS motor 180 having a wide range as the shaking correction motor.

In other words, monitoring camera 200 can compensate for the gravity load of image sensor 104. In addition, monitoring camera 200 can reduce the required thrust force of BIS motor 180 for shaking correction and reduce power consumption in a steady state (for example, in a state without shaking). Even if the inclination of the movable portion A2 changes and the component force of gravity changes, the spring elastic force can be adjusted by changing the winding amount of the gear according to the component force of gravity. In addition, it is possible to use BIS motor 180 for shaking correction specialized for the force required for shaking correction which does not include the gravity component, and it is possible to reduce the power consumption required by BIS motor 180.

As described above, monitoring camera 200 includes image sensor 104 that images subject B1, lens unit 130 that includes lens 131 that forms the image of subject B1 on the light receiving surface of image sensor 104, movable portion A2 that includes image sensor 104 and is movable with respect to lens unit 130, BIS mechanism unit 110 for moving movable portion A2 to correct the shaking according to the shaking occurring in monitoring camera 200, gravity compensation mechanism 120 which support movable portion A2 with a force equal to the component force of gravity applied to movable portion A2 along the direction perpendicular to optical axis Oc of lent unit 130 and opposite to the direction of the component force of gravity, and spring adjustment motor driver 123. Monitoring camera 200 is an example of a camera device. BIS mechanism unit 110 is an example of a shaking corrector. Gravity compensation mechanism 120 and spring adjustment motor driver 123 are an example of a gravity support.

Accordingly, monitoring camera 200 can support the force caused by the gravity applied to movable portion A2 by gravity compensation mechanism 120 and spring adjustment motor driver 123. Therefore, at the timing when the shaking correction is not performed since movable portion A2 including image sensor 104 remains at reference position xs, driving of BIS motor 180 for correcting the shaking can be made unnecessary. That is, it is possible to avoid that BIS motor 180 actually requires a driving force greater than the driving force required for shaking correction. Accordingly, monitoring camera 200 can reduce the driving force of BIS motor 180 and extend the life of BIS motor 18. As described above, it is possible to reduce the driving force of BIS motor 180 driving BIS mechanism unit 110, taking into account the influence of gravity acting on BIS mechanism unit 110.

Gravity compensation mechanism 120 may include gravity compensation spring 121 connected to movable portion A2, gear 124 for adjusting the length of gravity compensation spring 121, spring adjustment motor 122 for supplying a driving force to gear 124. Spring adjustment motor driver 123 may control the driving force of spring adjustment motor 122. Gravity compensation spring 121 is an example of an elastic member. Spring adjustment motor 122 is an example of a motor. Spring adjustment motor driver 123 is an example of a motor driver.

Accordingly, monitoring camera 200 determines the spring elastic force of gravity compensation spring 121 by supplying the driving force necessary for gravity compensation to gear 124, and can support the component force of gravity applied to movable portion A2. In addition, by adjusting the position of gear 124 once, it is unnecessary to continuously drive spring adjustment motor 122, the driving force of spring adjustment motor 122 can be reduced, and energy saving can be achieved.

Monitoring camera 200 may further include position sensor 150 for acquiring information on position x of image sensor 104 in the direction perpendicular to optical axis Oc of lens unit 130 with respect to lens unit 130. Spring adjustment motor driver 123 controls the driving force of spring adjustment motor 122 so that image sensor 104 is disposed at reference position xs based on the information on the position of image sensor 104 detected by position sensor 150.

Monitoring camera 200 can adjust image sensor 104 to be disposed at reference position xs by using the information of the difference between the information on the current position of image sensor 104 and the position of reference position xs. Accordingly, monitoring camera 200 can maintain position x of image sensor 104 constant while maintaining gravity compensation and shaking correction, thereby maintaining the image quality of the captured image constant.

In addition, position sensor 150 sends the information on the detected position of image sensor 104 to spring adjustment motor driver 123 and BIS motor driver 170.

Accordingly, the information on the position detected by position sensor 150 can be used for shaking correction and gravity compensation. That is, monitoring camera 200 can acquire the position information required at the time of shaking correction and the position information required at the time of gravity compensation by position sensor 150. That is, monitoring camera 200 can share position sensor 150 for shaking correction and for gravity compensation.

Monitoring camera 200 further includes inclination sensor 210 for detecting the inclination angle of lens unit 130 and inclination sensor 210 for detecting the angle of inclination of lens unit 130 on movable portion A2 along the direction perpendicular to optical axis Oc of lens unit 130 and CPU 250A for deriving the component force of gravity. Spring adjustment motor driver 123 may control the driving force of spring adjustment motor 122 based on the derived component force of gravity. CPU 250A is an example of a derivation unit.

Accordingly, monitoring camera 200 can estimate the component force of gravity without using position sensor 150, and can apply a spring reaction force to the component force of gravity to gravity compensation spring 211. That is, monitoring camera 200 can derive the spring elastic force to be applied to gravity compensation spring 121 with a simple configuration different from position sensor 150 for shaking correction, and can adjust the driving force of spring adjustment motor 122.

In addition, reference position xs may be positioned on optical axis Oc of lens unit 130.

As a result, monitoring camera 200 can be set center optical axis Oc as the center of the captured image, and the optical axis adjustment position and the geometric center position can be matched. Therefore, monitoring camera 200 can make the subject center coincide with the center of the image both in the case of gravity compensation and in the case of shaking correction in the case where there is no optical axis deviation or the optical axis has been adjusted.

In addition, reference position xs may be an optical axis adjustment position at which the optical axis deviation of the lens is adjusted.

Accordingly, by setting reference position xs to the position of optical axis adjustment value x1, monitoring camera 200 does not have to adjust the optical axis at the time of manufacturing monitoring camera 200, and monitoring camera 200 is unnecessary to adjust the optical axis adjustment member and to adjust the optical axis. The reason why monitoring camera 200 does not have to adjust the optical axis and is unnecessary to adjust the optical axis adjustment member and to adjust the optical axis is that setting reference position xs to the position of optical axis adjustment value x1 corresponds to optical axis adjustment. Therefore, monitoring camera 200 can compensate gravity by taking into account the optical axis shift of lens unit 130. Even in this case, monitoring camera 200 can make subject center coincide with the image center both in gravity compensation and in shaking correction.

In addition, spring adjustment motor driver 123 may make the driving force of spring adjustment motor 122 invariable during a period during which the shaking correction is performed by BIS mechanism unit 110.

Accordingly, monitoring camera 200 can suppress the spring elastic force of gravity compensation spring 121 from changing in the shaking correction period. Therefore, monitoring camera 200 can suppress the change of the position of movable portion A2 supported by gravity compensation spring 121, and image sensor 104 can be arranged at reference position xs in a state where movable portion A2 does not shaking. Therefore, the position adjustment of movable portion A2 with the shaking correction can be performed stably with reference position xs as a reference, and the accuracy of the shaking correction can be maintained.

Monitoring camera 200 may further include an inclination acquiring unit that acquires information on the inclination angle of lens unit 130. Spring adjustment motor driver 123 changes the driving force of spring adjustment motor 122 in a case where the inclination angle of lens unit 130 acquired by the inclination acquiring unit is changed. The inclination acquiring unit is, for example, CPU 250.

When the direction of lens unit 130 is changed, the direction of movable portion A2 also changes, and the component force of gravity applied to movable portion A2 also changes. Monitoring camera 200 adjusts the spring reaction force with respect to the component force of gravity applied to movable portion A2 in accordance with the change of the component force of gravity so that the position of image sensor 104 in a state where monitoring camera 200 is not shaking can be maintained constant. Therefore, monitoring camera 200 can be adjusted so as to dispose movable portion A2 at reference position xs regardless of the inclination angle of lens unit 130 while compensating the gravity and the image quality of the captured image can be maintained.

Hereinbefore, various embodiments have been described with reference to the accompanying drawings, but the present disclosure is not limited to these examples. It will be obvious to those skilled in the art that modification examples or revision examples and combination examples of the various embodiments may be made within a range without departing from the disclosure of claims, which are considered to be included in the technical scope of the present disclosure. In addition, each of the components in the embodiments described above may be combined in any manner without departing from the gist of the invention.

In the above embodiment, the processor may be physically configured in any way. In addition, if a programmable processor is used, processing contents can be changed by changing the program. Therefore, the degree of freedom in designing the processor can be increased. The processor may be configured of one semiconductor chip or may be physically configured of a plurality of semiconductor chips. In the case of a plurality of semiconductor chips, each control of the above exemplary embodiment may be realized by optional semiconductor chips. In this case, it can be considered that one processor is configured for the plurality of semiconductor chips. In addition, the processor may be configured by a member (capacitor or the like) having a function different from that of the semiconductor chip. In addition, one semiconductor chip may be configured so as to realize the functions of the processor and other functions. In addition, a plurality of processors may be configured by one processor.

The present disclosure is useful for the camera device, the gravity compensation method, and the like that can reduce the driving force of the motor that drives the shaking correction mechanism, taking into account the influence of gravity acting on the shaking corrector.

What is claimed is:

1. A camera device comprising:
an image sensor that images a subject;
a lens for forming an image of the subject on a light receiving surface of the image sensor;
a shaking correction frame that includes a movable portion which holds the image sensor and that moves the movable portion in a direction perpendicular to an optical axis of the lens according to the shaking of the camera device to correct shaking; and
a gravity support that supports the movable portion in a direction opposite to a direction of a component force of the gravity with a force equal to a component force of gravity applied to the movable portion along a direction perpendicular to the optical axis of the lens, the gravity support comprising:
an elastic member connected to the movable portion,
a gear that adjusts a length of the elastic member,
a motor that supplies a driving force to the gear, and
a motor driver that controls the driving force of the motor.

2. The camera device of claim 1, further comprising:
a position sensor that acquires information on a position of the image sensor in a direction perpendicular to the optical axis of the lens with respect to the lens,
wherein the motor driver controls the driving force of the motor so that the image sensor is disposed at a reference position based on information on the position of the image sensor detected by the position sensor.

3. The camera device of claim 2,
wherein the position sensor transmits information on the detected position of the image sensor to the gravity support and the shaking correction frame.

4. The camera device of claim 2,
wherein the reference position is positioned on the optical axis of the lens.

5. The camera device of claim 2,
wherein the reference position is a position where an optical axis deviation of the lens is adjusted.

6. The camera device of claim 1, further comprising:
an inclination sensor that detects an inclination angle of the lens; and
a derivation unit that derives a component force of gravity applied to the movable portion along a direction perpendicular to the optical axis of the lens based on the inclination angle of the lens,
wherein the motor driver controls the driving force of the motor based on the derived component force of gravity.

7. The camera device of claim 6,
wherein the motor driver makes the driving force of the motor invariable during a period in which the shaking correction is performed by the shaking correction frame.

8. The camera device of claim 6, further comprising:
an inclination acquiring unit that acquires information on the inclination angle of the lens,
wherein, in a case where an inclination angle of the lens acquired by the inclination acquiring unit is changed, the motor driver changes the driving force of the motor.

9. The camera device of claim 1,
wherein the motor driver makes the driving force of the motor invariable during a period in which the shaking correction is performed by the shaking correction frame.

10. The camera device of claim 1, further comprising:
an inclination acquiring unit that acquires information on the inclination angle of the lens,
wherein, in a case where the inclination angle of the lens acquired by the inclination acquiring unit is changed, the motor driver changes the driving force of the motor.

11. A gravity compensation method in the camera device that includes a shaking corrector which has a movable portion that holds the image sensor and moves the movable portion in a direction perpendicular to an optical axis of the lens unit that forms an image of a subject on a light receiving surface of the image sensor according to shaking of the camera device to correct shaking, the method comprising:
supporting the movable portion, via a gravity support having an elastic member connected to the movable portion, having a gear that adjusts a length of the elastic member, having a motor that supplies a driving force to the gear, and having a motor driver that controls the driving force of the motor, in a direction opposite to the direction of a component force of gravity by a force having the same magnitude as the component force of the gravity applied to the movable portion along a direction perpendicular to the optical axis of the lens unit.

* * * * *